(12) United States Patent
Furtaw et al.

(10) Patent No.: US 7,856,899 B2
(45) Date of Patent: Dec. 28, 2010

(54) VENT AND SOIL FLUX MEASUREMENT SYSTEM

(75) Inventors: Michael D. Furtaw, Lincoln, NE (US); Dayle K. McDermitt, Lincoln, NE (US); Liukang Xu, Lincoln, NE (US)

(73) Assignee: LI-COR, Inc., Lincoln, NE (US)

( * ) Notice: Subject to any disclaimer, the term of this patent is extended or adjusted under 35 U.S.C. 154(b) by 0 days.

(21) Appl. No.: 12/371,478

(22) Filed: Feb. 13, 2009

(65) Prior Publication Data
US 2009/0139307 A1 Jun. 4, 2009

Related U.S. Application Data

(62) Division of application No. 11/063,955, filed on Feb. 22, 2005, now Pat. No. 7,748,253.

(60) Provisional application No. 60/634,685, filed on Dec. 8, 2004.

(51) Int. Cl.
G01N 1/22 (2006.01)
(52) U.S. Cl. ...................... 73/864.73; 73/23.2
(58) Field of Classification Search ............. 73/864.51, 73/864.73, 23.2, 864.83
See application file for complete search history.

(56) References Cited

U.S. PATENT DOCUMENTS

| | | | | |
|---|---|---|---|---|
| 3,333,458 A | * | 8/1967 | Heath et al. .................. 73/23.2 |
| 3,625,389 A | | 12/1971 | Bartlow | |
| 4,444,041 A | * | 4/1984 | Zison ......................... 73/19.04 |
| 5,355,739 A | * | 10/1994 | Cooper et al. ............ 73/864.73 |
| 6,598,458 B1 | * | 7/2003 | Edwards et al. .............. 73/19.1 |
| 6,692,970 B2 | * | 2/2004 | Butnor et al. ................ 436/148 |
| 7,392,689 B2 | * | 7/2008 | Kim et al. ................... 73/31.02 |
| 7,520,186 B2 | * | 4/2009 | Risk ......................... 73/864.74 |
| 2002/0000226 A1 | | 1/2002 | Butnor et al. | |
| 2002/0100860 A1 | | 8/2002 | Wieder | |
| 2004/0200460 A1 | | 10/2004 | Mitani et al. | |
| 2006/0117840 A1 | * | 6/2006 | Furtaw et al. ................. 73/149 |
| 2009/0301234 A1 | * | 12/2009 | Risk ......................... 73/864.83 |

FOREIGN PATENT DOCUMENTS

| | | |
|---|---|---|
| WO | WO 02/93978 A2 | 11/2002 |
| WO | WO 02/93978 A3 | 11/2002 |

OTHER PUBLICATIONS

"Model 61202 Barometric Pressure Sensor," R.M. Young Company, 1 page (2004).

B.A. Kimball, "A canopy gas exchange: Gas exchange with soil," Limitations to efficient water use in crop production published by ASA-CSSA-SSSA, pp. 215-226 (1983).

(Continued)

*Primary Examiner*—John Fitzgerald
(74) *Attorney, Agent, or Firm*—Townsend and Townsend and Crew LLP; Gerald T. Gray (57) ABSTRACT

A method and apparatus are provided for maintaining pressure inside a closed chamber equal to the changing outside pressure, detecting leaks in the plumbing (i.e., air handling system) of a trace gas flux measurement system, and estimating the kinetic volume, e.g., of such a system.

2 Claims, 10 Drawing Sheets

OTHER PUBLICATIONS

F. Conen and K.A. Smith, "A re-examination of closed flux chamber methods for the measurement of trace gas emissions from soils to the atmosphere," European Journal of Soil Science, vol. 49, pp. 701-707 (1998).

G.L. Hutchinson and G.P. Livingston, "Vents and seals in non-steady-state chambers used for measuring gas exchange between soil and the atmosphere," European Journal of Soil Science, vol. 52, pp. 675-682 (2001).

J.M. Welles, T.H. Demetriades-Shah and D.K. McDermitt, "Considerations for measuring ground $CO_2$ effluxes with chambers," Chemical Geology, vol. 177, pp. 3-13 (2000).

N.T. Edwards, "A moving chamber design for measuring soil respiration rates," Oikos, vol. 25, pp. 97-101 (1974).

PCT International Search Report of the International Searching Authority (the European Patent Office) regarding Application No. PCT/US05/04727, dated Jul. 3, 2006, 5 pages.

* cited by examiner

VENT AND SOIL FLUX MEASUREMENT SYSTEM

CROSS-REFERENCE TO RELATED APPLICATION

This application is a divisional of U.S. patent application Ser. No. 11/063,955, filed Feb. 22, 2005 now U.S. Pat. No. 7,748,253 entitled VENT AND SOIL FLUX MEASUREMENT SYSTEM which claims the benefit of U.S. Provisional Application No. 60/634,685, filed Dec. 8, 2004 which are both hereby incorporated by reference.

BACKGROUND

Trace gas (e.g., $CO_2$ and methane) emissions from soils play a significant role in global climate change. Social, economic, and political forces are at work, which make it imperative that the scientific community provide quantitative measurement techniques and accurate data. Chambers are the most widely-used method for measuring trace gas emissions from soils. There are a number of problems associated with chamber measurements.

Emissions from soil are strongly influenced by pressure. With that in mind, scientists have suggested using some type of vent to keep the pressure inside a measurement chamber in equilibrium with the outside pressure. While such devices have worked under conditions where there was very little wind, these devices do not mimic the dynamic pressure component induced by wind outside the chamber. There is a need, therefore, for an improved vent design that will allow chamber pressures to stay in equilibrium with outside pressure in the face of changing static and dynamic components.

Further, any time gasses are moved from a sampling chamber to an instrument used to analyze gas concentrations, leaks can be (and often are) a problem. An apparatus and methodology for detecting leaks in such a system would be an important improvement, particularly as more complex systems are used involving multiplexing numerous chambers to a single analysis instrument thru some type of gas manifold.

Additionally, in any closed-transient measurement of gas exchange, volume must be known accurately. In most systems, it is unlikely that the volume is known any better than a few percent even when a chamber is placed on a level desktop. When a chamber is placed on an uneven soil surface and/or the surface has very large air filled pores, the problem is amplified. A technique to accurately estimate the kinetic volume of any given installation would be an improvement over the current state of the art.

SUMMARY

The present invention is defined by the following claims, and nothing in this section should be taken as a limitation on those claims.

By way of introduction, in one preferred embodiment, a method and system are disclosed for pressure equilibration. In another preferred embodiment, a method and system are disclosed for leak detection. In yet another preferred embodiment, a method and system are disclosed for determining kinetic volume. Other preferred embodiments are provided, and each of the preferred embodiments described herein can be used alone or in combination with one another. While these preferred embodiments are sometimes described for use in a gas analysis system, such as a soil flux measurement system, these embodiments can be used in other fields.

The preferred embodiments will now be described with reference to the attached drawings.

DETAILED DESCRIPTION OF THE PRESENTLY PREFERRED EMBODIMENTS

The following paragraphs describe presently preferred embodiments related to a pressure vent, detecting leaks in a chamber system, and determining kinetic volume. While these embodiments are being described separately, it is important to note that each of these embodiments can be used alone or in combination with any or all of the others. Further, while these embodiments will be described in the context of a soil flux measurement system to measure $CO_2$ from soil, it should be noted that other trace gasses, such as water vapor, methane, nitrogen oxide, and carbon monoxide, can be detected. Also, the embodiments can be used in measurements of any gas in a closed chamber application for the measurement of such gas flux from or into a porous medium, as well as other applications.

Pressure Vent Embodiments

Figure 1:
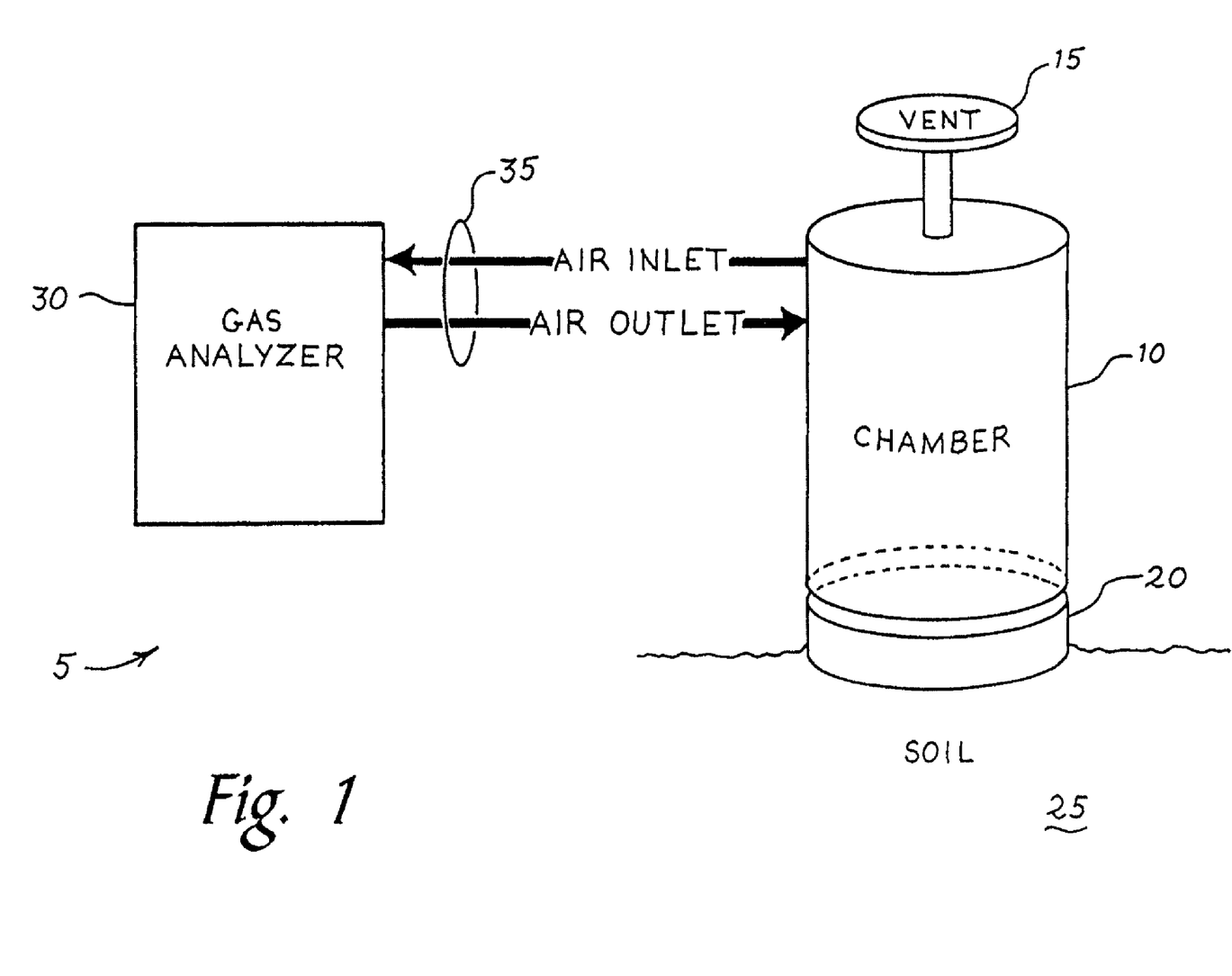
FIG. 1 is a block diagram of a system of a preferred embodiment.

Turning now to the drawings, FIG. 1 is an illustration of a system 5 for measuring a trace gas (such as $CO_2$) from soil. The system 5 comprises a chamber 10 with a vent 15, and a collar 20 installed in soil 25. The chamber 10 is coupled with a gas analyzer 30 via air inlet and outlet conduits 35. As used herein, a "conduit" is used to broadly refer to any components that is used to transport gas from one component to another. Examples of conduits include, but are not limited to, plastic, rubber, or metal tubing or piping. The terms "tubing," "plumbing," "piping," and "conduits" are used interchangeably herein. Also, the phrase "coupled with" means directly coupled with or indirectly coupled with through one or more than one component, such as conduit(s).

In operation, the chamber 10 is placed over the collar 20, and the gas analyzer 30 measures the change in concentration over time of a gas leaving the soil, which indicates the flux rate of the gas moving from the soil 25 to the atmosphere. The collar 20 provides an air-tight seal and causes the flux to move in a vertical direction. Equalizing pressure within a closed soil flux chamber has been a continuing problem despite the length of time chambers have been used to make such measurements. Very small amount of pressures, as small as a couple Pascal can change the flux significantly (atmosphere pressure is about 98,000 Pascal). Such pressure changes can be caused by temperature changes in the chamber 10 and water evaporating in the chamber 10. Vents have been used with chambers to allow the pressure in the chamber to balance with the pressure outside of the chamber. However, when the wind blows, it is difficult to balance the pressure correctly. Currently, chambers are equipped with vents that are either wind-speed dependent (i.e., as wind speed increases, so do the pressure differences) or wind-direction dependent (i.e., the vent works only for wind in certain directions, thus the orientation of the chamber would have to be adjusted for changing winds). These problems are significant enough that some scientists, such as Conen and Smith ("A reexamination of closed flux chamber methods for the measurement of trace gas emissions from soils to the atmosphere," European Journal of Soil Science, vol. 49, pp. 701-707 (1998)), have recommended accepting the consequences of not using a pressure vent at all. Others, such as Hutchinson and Livingston ("Vents and seals in non-steady-state chambers used for measuring gas exchange between soil and the atmosphere," European Journal of Soil Science, vol. 52, pp. 675-682 (2001)), as well as LI-COR Biosciences (the assignee of the present invention) (Welles, Demetriades-Shah, and McDermitt, "Considerations for measuring ground CO2 effluxes with chambers," Chemical Geology, vol. 177, pp. 3-13 (2000)) have determined it to be highly desirably, if not absolutely necessary, to have a properly-designed vent for any closed chamber trace gas measurement.

Figure 2:
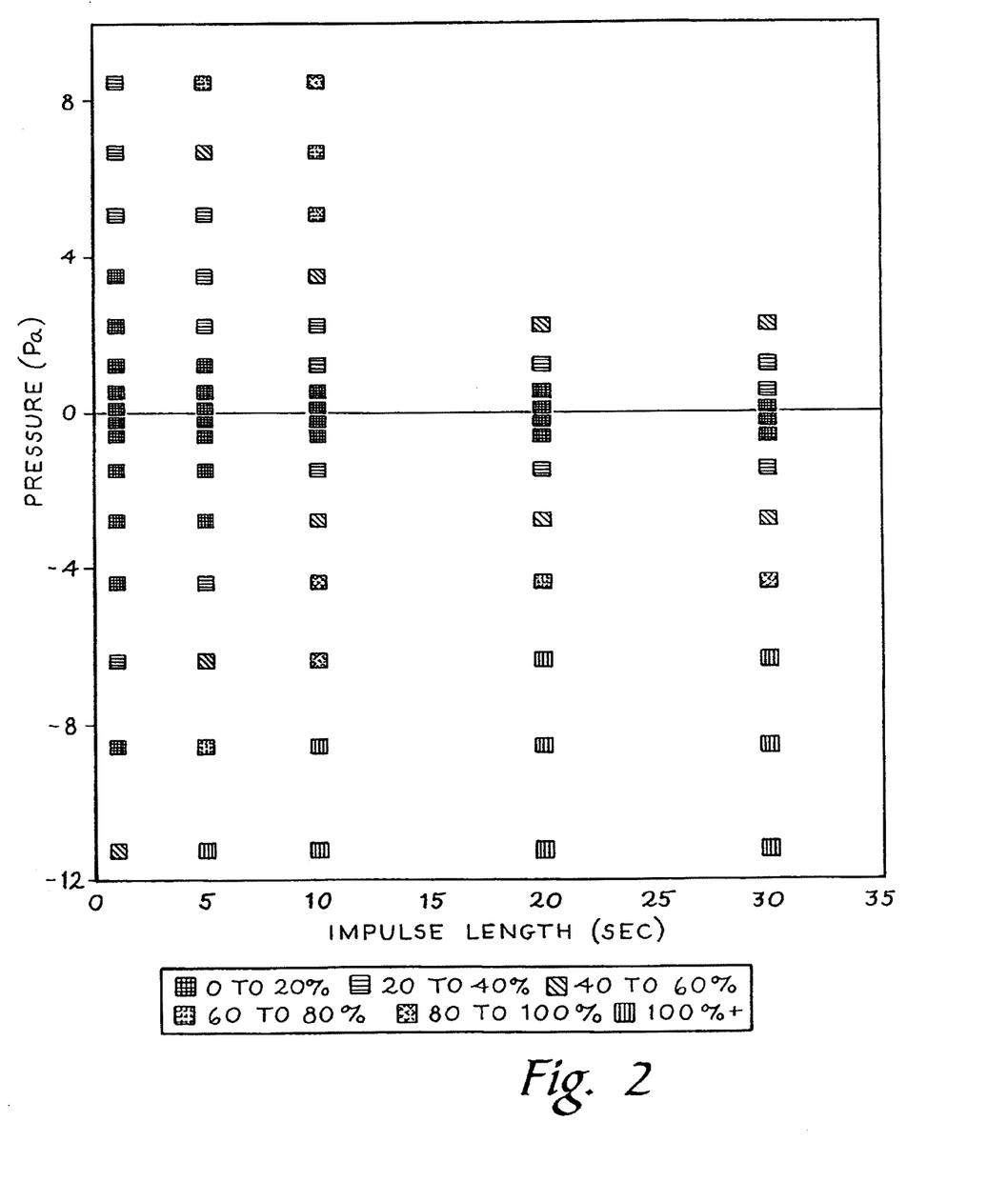
FIG. 2 is a graph illustrating $CO_2$ flux effects from pressure perturbations at different magnitudes and impulse lengths.

The importance of equalizing the pressure within a soil flux chamber has been proven experimentally by the inventors, the result of which is shown in FIG. 2. FIG. 2 illustrates the effect of time length of different pressure pulses and their magnitudes on $CO_2$ flux (the rate is measured by the hybrid, for example). (The pressures listed in FIG. 2 are for a chamber sitting on soil. The pressures listed in the other figures in this document refer to pressures within a chamber with a sealed-off collar (i.e., the chamber is not sitting on soil). The pressures in FIG. 2 would be significantly higher with a sealed-off collar.) It has been shown that for perturbations of one second or less in length of time, a pressure disruption of only 4 Pa can cause significant changes to the natural efflux rate. It has also been shown that any pressure difference above a magnitude of 1 Pa will cause a significant efflux rate change within 30 seconds. Therefore, it is preferred that the soil surface pressure within a soil flux chamber is maintained at its ambient value for all conditions before, during, and after a flux measurement so that the measured flux value is representative of values outside the chamber. Current venting techniques of soil flux chambers can easily cause errors well above 25% in moderate wind conditions.

The vent 15 used in this preferred embodiment maintains the ambient soil surface pressure within a closed soil flux chamber by taking into account the pressure and wind relationship and how it interacts with the soil surface. By use of Bernoulli's equation, it is understood that the static pressure drops in windy conditions. Therefore, if a vent balances with the static pressure at the top of the chamber where the vent is located, it will be creating artificially-low chamber pressures in windy conditions. This is because the wind decreases as you approach the soil surface; hence a boundary layer exists. The wind does not go to zero at the soil surface, though, because wind is not a laminar flow. Instead, the wind is more of a transitional flow (neither laminar nor turbulent). Transitional flows approach 10 to 40% of the free stream velocity (wind speed outside the boundary layer) at the surface. In order to equalize the pressure within the chamber with a vent located at the top of the chamber itself (to eliminate directional dependence), the vent preferably reduces the wind speed similarly to the boundary layer at the soil surface.

Figure 3:
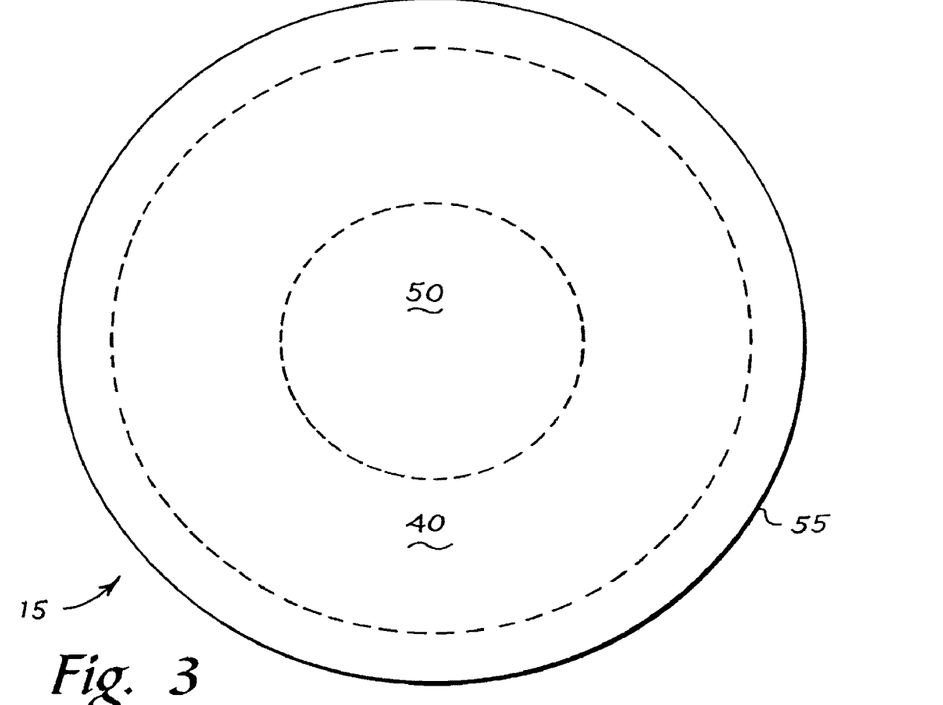
FIG. 3 is a top view of a vent of a preferred embodiment.
Figure 4:
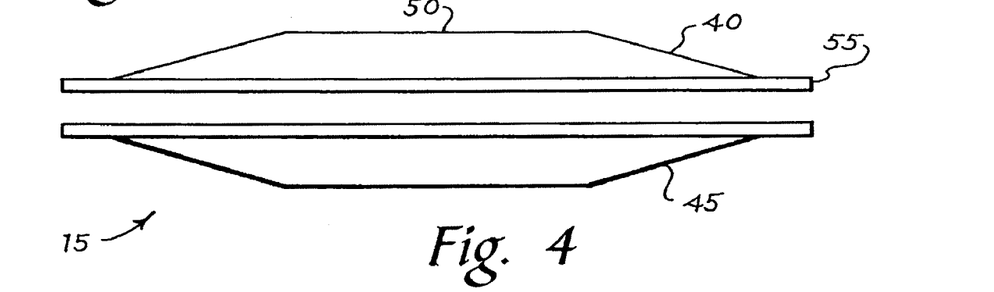
FIG. 4 is a side view of a vent of a preferred embodiment.
Figure 5:
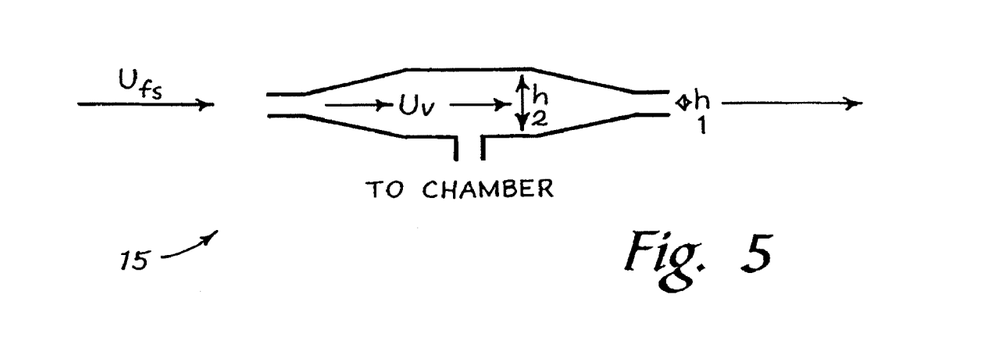
FIG. 5 is a cross-sectional view of a vent of a preferred embodiment.

FIGS. 3, 4, and 5 are top, side, and cross-sectional views, respectively, of the vent 15 of this preferred embodiment. The vent 15 comprises first and second vent surfaces 40, 45 (or plates). As shown in these figures, in this preferred embodiment, the vent 15 comprises a cylindrical symmetrical shape, which eliminates directional dependence of the wind. The vent 15 reduces the speed of the wind and, thus, converts some dynamic pressure into static pressure by having an increasing cross-sectional profile as the air approaches the pressure tube opening into the chamber 10. As shown in the figures, the distance between the first and second vent surfaces 40, 45 decreases from the center region 50 of the vent to the edge 55 of the vent 15, which comprises the inlet/outlet region. (The term inlet/outlet is used since wind direction determines whether any given part of the edge opening is an inlet or outlet (i.e., an inlet in one wind condition can be an outlet in another wind condition).) Specifically, by conservation of mass, the free stream velocity of the wind, $U_{fs}$, decreases proportionally to the cross-sectional area when flowing through the vent 15, $U_v$. In this case, $U_v$ equals $h_1/h_2$ ($U_{fs}$) for any small, arbitrary width. By accomplishing this, the vent 15 applies the correct pressure within the chamber 10 by creating the same static pressure that the soil surface 25 experiences in natural conditions without being sensitive to wind direction or magnitude. Accordingly, the pressure at the soil surface 25 is the same as if the chamber 10 was not present.

It is preferred that the height of the center region $h_2$ be about five times greater than a height of the inlet/outlet region $h_1$ and that the vent 15 taper from the center region 50 to the inlet/outlet region 55 at an angle of about 15 degrees or less. In one presently preferred embodiment, $h_2$ is ⅝ inch, $h_1$ is ⅛ inch, the opening to the chamber 10 is ¼ inch. It is also preferred that the vent 15 be positioned far enough away from a surface of the chamber 10 to allow air to enter the vent 15 at a free stream velocity. That is, the vent 15 is out of the boundary layer, which apply viscous forces that affect the magnitude of the wind (i.e., the vent 15 is far enough away from any surface of the chamber 10 (or the ground) that the wind enters the vent 15 at free stream velocity).

Figure 6:
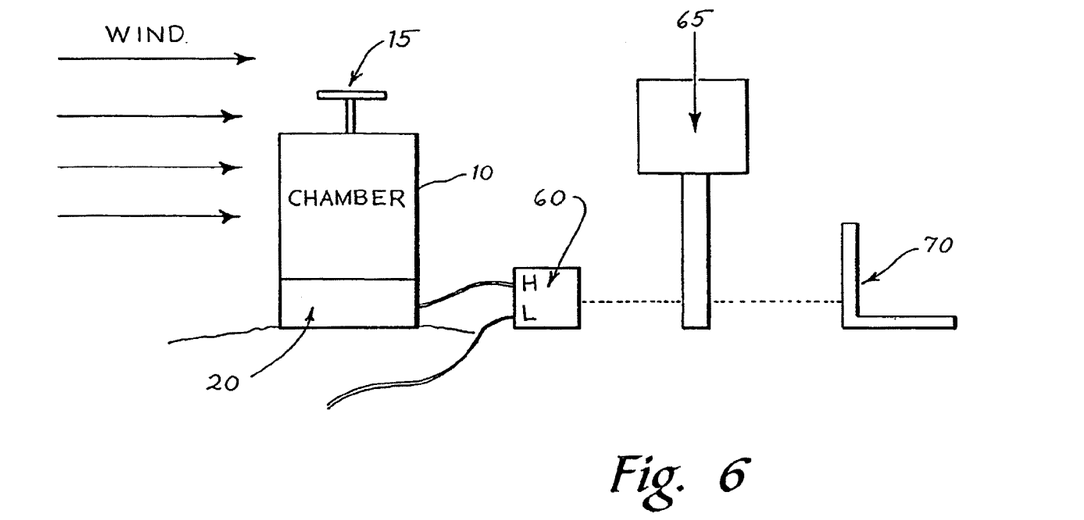
FIG. 6 is block diagram of a system to test performance of a vent of a preferred embodiment.
Figure 7:
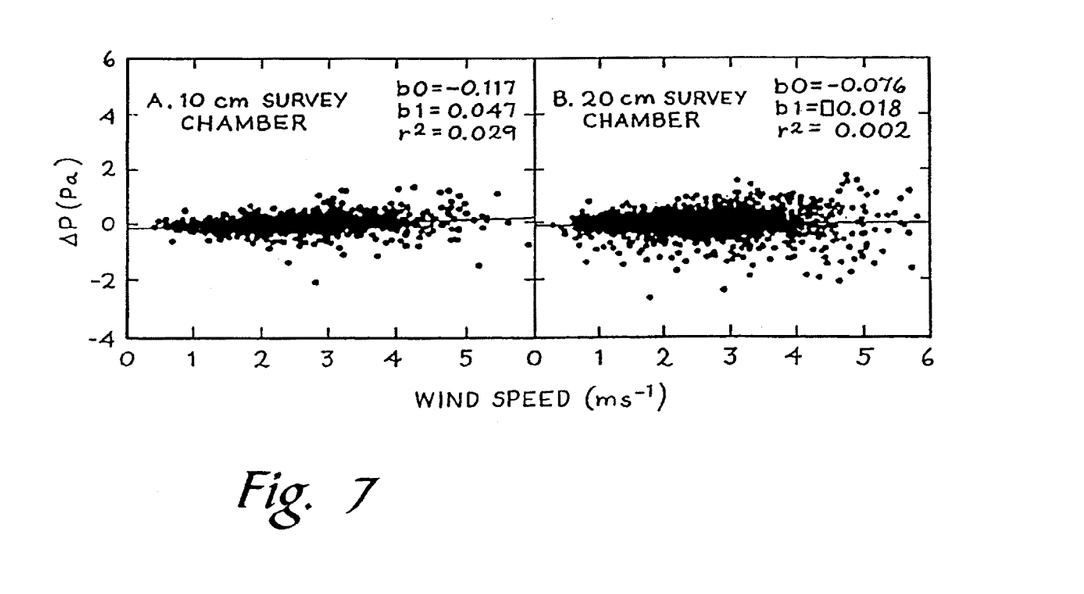
FIG. 7 is an illustration of pressure inside 10 and 20 cm chambers as a function of horizontal wind speed using a vent of a preferred embodiment.

The effectiveness of the vent 15 has been proven experimentally with the testing system shown in FIG. 6. This system comprises a differential pressure transducer 60, with its high side at the soil surface in the chamber 10, and the low side at the soil surface outside the chamber 10. The system also comprises an anemometer 65, which measures wind speed, and a computer 70 logging data. The results of this testing are illustrated in the graph of FIG. 7, which shows that the pressure within the chamber 10 stays very close to the ambient conditions at a variety of wind speeds (even relatively high wind speeds, which can cause pressure variations in typical vents). As stated before, it is preferred to stay within one Pa of the ambient pressure (even less when sitting on porous soil). Thus, the vent 15 eliminates measurement errors due to pressure perturbations in windy conditions.

There are several alternatives that can be used with these embodiments. For example, in the embodiment described above, the two vent surfaces 40, 45 both tapered from the center region 50 to the edge 55. In an alternate embodiment, one of the vent surfaces tapers while the other vent surface does not. This alternate embodiment still provides the goal of decreasing the first and second vent surfaces from the center of the vent to the edge of the vent. In another alternate embodiment, the vent is not cylindrically symmetrical. Although not independent on wind direction, such an alternative can be used if, for example, a user is available to move the vent depending on the wind direction. Further, while the chamber was used in a soil flux measurement system to measure $CO_2$ from soil, other trace gasses, such as water vapor and methane, can be detected. Also, the disclosed vent can be used in chambers other than those used for soil flux measurements. That is, the vent design may also be used in non-soil-flux-chamber applications where pressure equilibration of a chamber to outside air or with another pressure vessel is desired (e.g., anytime you have some enclosed volume in which you need to balance the pressure with that of the surface it is sitting on).

Leak Detection Embodiments

In soil flux measurement systems, it is preferred that no leaks exist within the plumbing or within the components of the system in order to eliminate measurement error associated with such conditions. Leaks can occur from defects in tubing, improperly installed fittings, defective fittings, or leaks in the pump(s) or the analyzer itself. Additionally, in a multi-chamber set-up, a manifold (i.e., multiplexer) and valves assembly is introduced along with multiple fittings. (With a multiplexer, a single gas analyzer can be used for a plurality of chambers. By automating this system, a protocol can be developed so that the instrument automatically checks for leaks on a periodic basis.) In this case, leaks become much more common and are, therefore, preferably detected.

Figure 8:
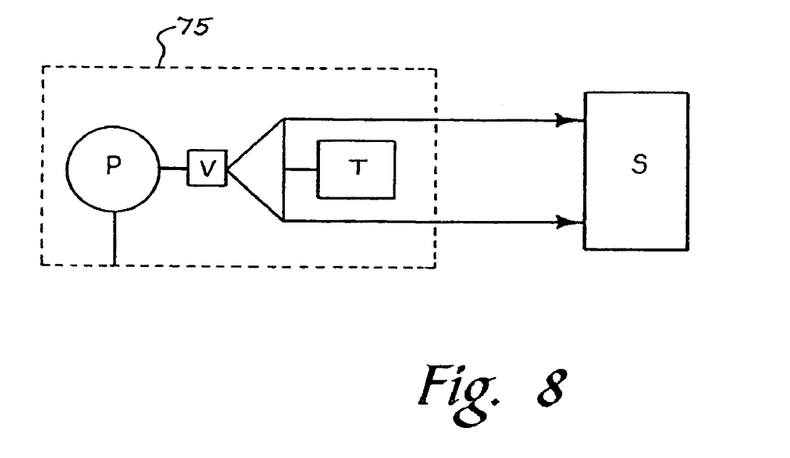
FIG. 8 is a block diagram of a leak detection system of a preferred embodiment.
Figure 9:
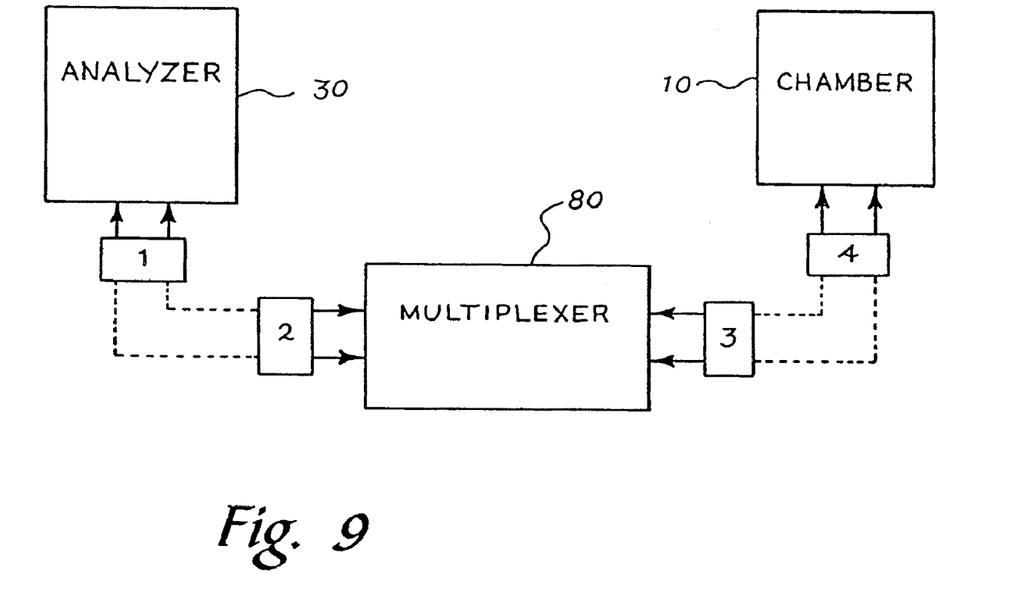
FIG. 9 is a block diagram illustrating possible detection points within an automated soil flux system of a preferred embodiment.

FIG. 8 is a pneumatic diagram of leak detection system 75 of a preferred embodiment for use with a soil flux measurement system S, which is the closed system to be tested. The leak detection system 75 comprises at least one pump P, two or more valves V, and at least one pressure transducer (differential or absolute, depending on the plumbing and protocol) T. In this arrangement, the pump P would run until some chosen pressure existed in the closed system S. Upon creating the desired pressure, the valve V would be shut to protect the pump P. The pressure would then be monitored for a specified time by the pressure transducer T. If a leak exists, the pressure will change significantly over that period of time. The closed system S could be a gas analyzer, a multiplexer module 80 (see FIG. 9), or even a single chamber if properly sealed. Possible detection points within a soil flux system are shown in FIG. 9. By adding strategically placed valves, the system can be tested in sections for more precise leak locating ability. This diagram shows the most simple of set-ups in which the system S is tested all at once.

Figure 10:
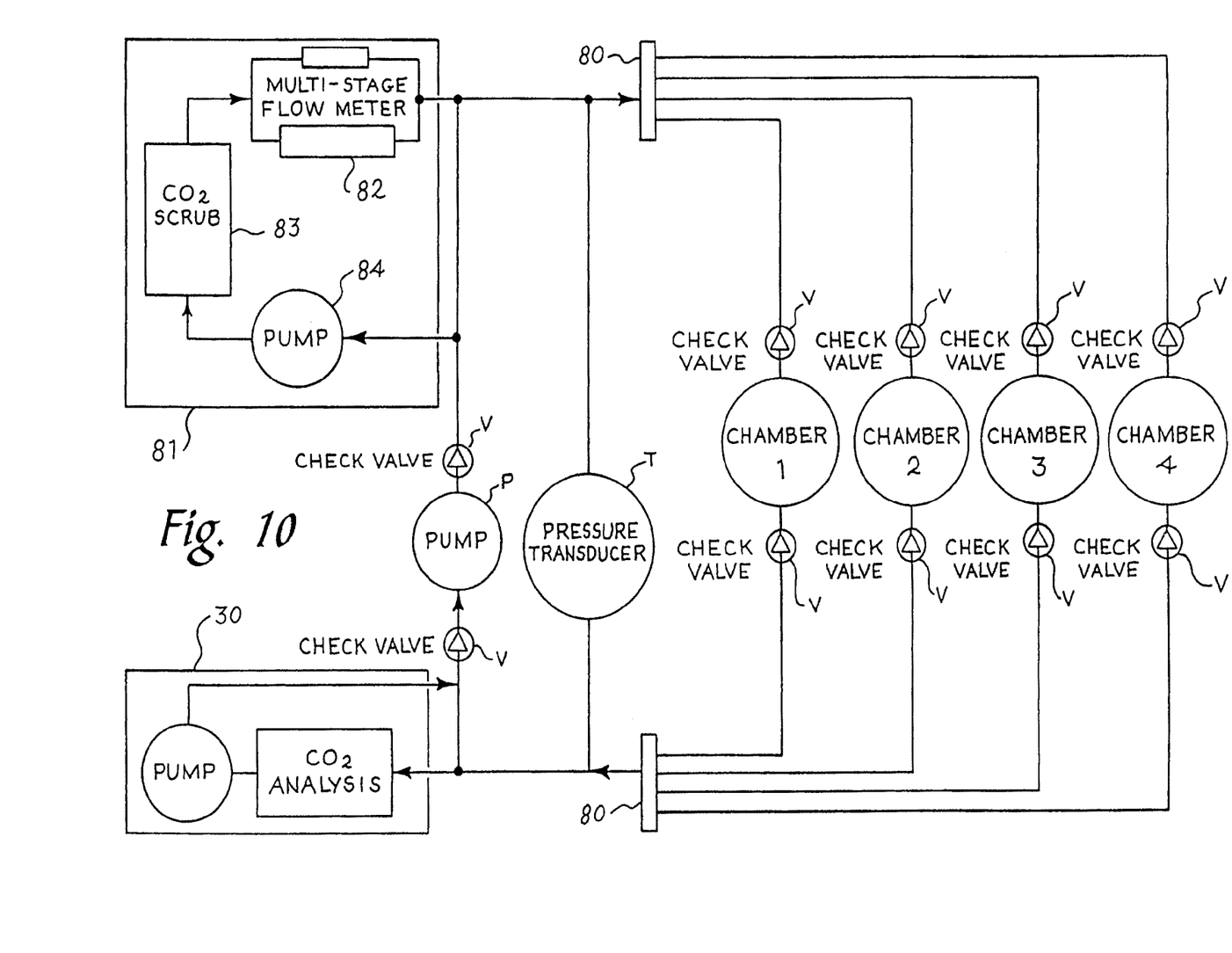
FIG. 10 is a schematic diagram of an apparatus designed to measure trace gas fluxes from soil of a preferred embodiment.

Other arrangements can be used. For example, while shown as a stand-alone component separate from the flux measurement system S, the leak detection system can be built into a soil respiration measurement system, as shown in FIG. 10 (the other components in this figure will be described below). In this alternative arrangement, the same components can exist within the analyzer 30, multiplexer 80, or chamber 10 and simply be permanent components of the designated instrumentation devices. Also, in some cases, components for leak detection may already be incorporated into a system for other reasons. For example, a pump exists for flow to and from the chambers and can be used for the purpose of leak detection by adding hardware and appropriate protocol.

Kinetic Volume Determination Embodiments

Depending upon the soil ecosystem, it is quite likely that the kinetically-active volume may actually extend into the soil some distance. Any inaccuracies in estimating kinetic volume will have a direct and proportionate impact on estimates of the rate of soil $CO_2$ flux. Consider the situation in which a chamber is used to make soil flux measurements on forest soils and the collar passes through several inches of plant litter on the soil surface. In this situation, a simple collar depth measurement does not provide an accurate volume measurement. However, if the correct $CO_2$ flux rate were known a priori, volume can be derived kinetically. In this preferred embodiment, which involves a hardware device and a unique methodology used in conjunction therewith, a user would make a one-time null balance estimate of the $CO_2$ flux rate immediately before making a transient measurement. In the ideal, the null balance measurement of the $CO_2$ flux will be:

$$F_c(ss) = \frac{U \times C}{A}. \qquad \text{eq 1}$$

In the transient measurement, the $CO_2$ flux will be:

$$F_c(trans) = \frac{V \times \rho \times \frac{dC}{dt}}{A}. \qquad \text{eq 2}$$

This equation can be rearranged to solve for Volume as follows:

$$\text{Volume} = \frac{(F_c(ss) \times A / \rho)}{\left(\frac{dC}{dt}\right)}. \qquad \text{eq 3}$$

In practice, one would never reach a perfect steady state, even in a null balance steady-state system. Therefore, one you would expect a transient term in the steady-state Flux equation:

$$F_c(ss) = \frac{U \times C}{A} + \frac{V \times \rho \times \frac{dC}{dt}}{A}. \qquad \text{eq 4}$$

Where:
$F_c$(ss): soil $CO_2$ flux measured in steady state conditions
$F_c$(trans): soil $CO_2$ flux measured in transient conditions
U: flow rate of $CO_2$-free air
C: $CO_2$ concentration
A: area covered by a measurement chamber
V: volume of a chamber and associated plumbing in a measurement system
$\rho$: Density of air
t: time The concept is termed a "null balance method" in which a known amount of air circulating through the measurement system and chamber is scrubbed of $CO_2$ in order to balance the $CO_2$ emissions from the soil. In this method, soil $CO_2$ flux is estimated using equation 1, which does not require an estimate of volume.

Immediately after making a null balance measurement of soil $CO_2$ flux, the scientist would re-measure the rate by the transient method and use the flux rate from the null balance method to solve for the kinetic volume in equation 3. One could then use the kinetically-determined volume for subsequent transient measurements (equation 2).

In some cases, the null balance method will not reach a perfect steady state. The model for this scenario is equation 4. In this case, the transient term will be small but not zero, and the volume in that term will only be a rough estimate. An iterative process would be followed to fine tune the flow rate of $CO_2$-free air necessary to balance the soil $CO_2$ emissions until the transient term is "negligible," whatever that is defined to mean. Even if the transient term is not zero, the dependence on volume will be much reduced. In summary, a method is provided for determining an active volume of a chamber over a non-uniform surface that has air-filled pores where the active volume is unknown. The method comprises the acts of measuring a steady state flux and then using the measured steady state flux to determine an active volume in a transient flux measurement. (The steady state and transient flux measurements can be of $CO_2$ or methane, for example). Returning to FIG. 10, component 81 shows the components used for null balance mode determination, which comprises a multi-stage flow meter 82, a $CO_2$ scrub 83, and a pump 84. These components are used to measure a steady state flux and then determine an active volume in a transient flux measurement from the measured steady state flux.

Figure 11:
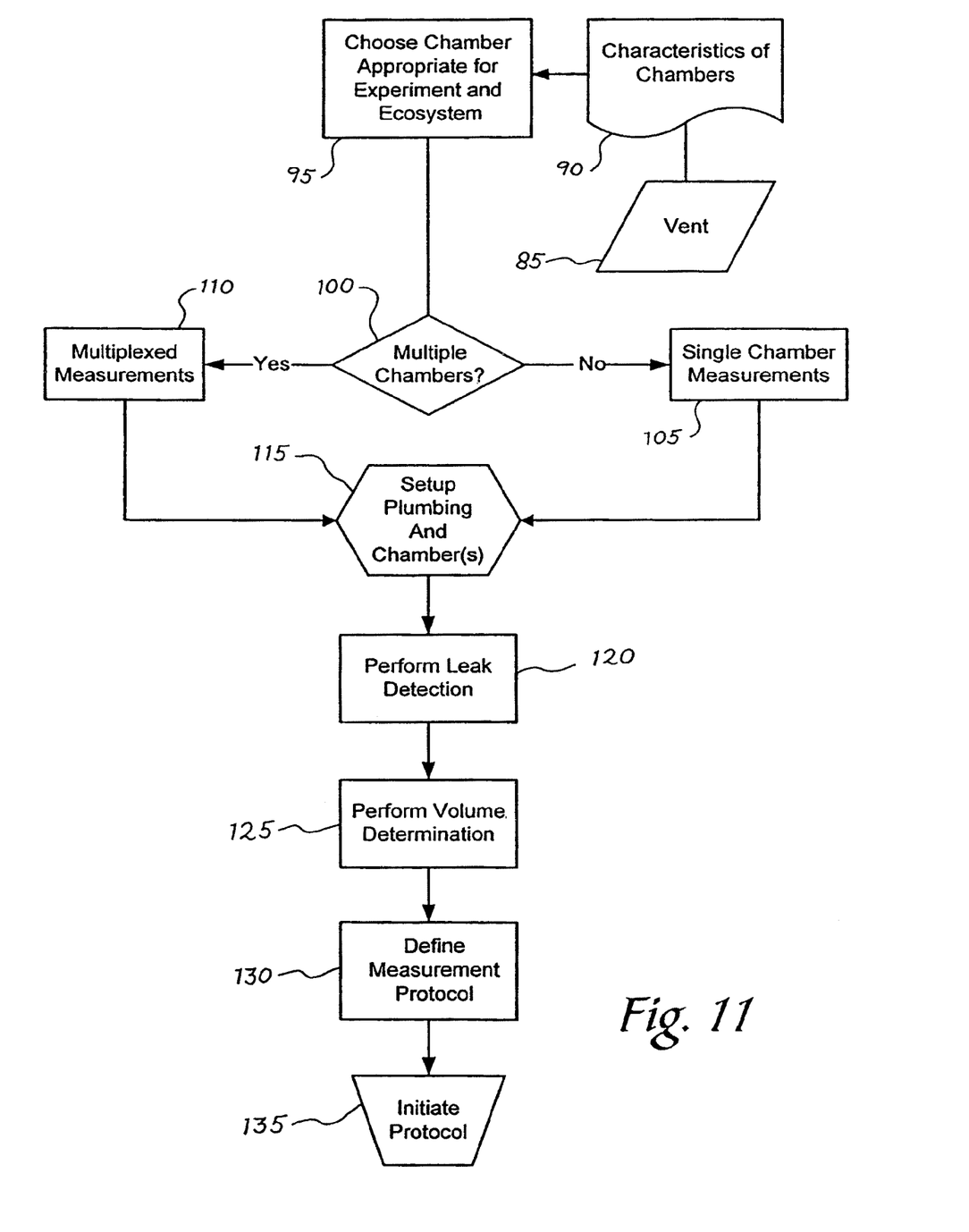
FIG. 11 is a flow chart illustrating the processes involved in making measurements of trace gas fluxes using chambers of a preferred embodiment.

Turning again to the drawings, FIG. 11 is a flow chart illustrating the processes involved in making measurements of trace gas fluxes using chambers of a preferred embodiment. Using the vent 85 and other characteristics of chambers 90, the chamber appropriate for the experiment and ecosystem is chosen 95. Next, it is determined whether multiple chambers are used 100. If a single chamber measurement is used 105, no multiplexer is needed. If there are multiple chambers, multiplexer measurements are needed 110. Next, the plumbing and chamber(s) are set-up 115, and leak detection 120 and volume determination 125 are performed. Finally, a measurement protocol is defined 130, and the protocol is initiated 135.

Example of a Multiplexed Soil $CO_2$ Flux Measurement System

The following is an example of a multiplexed soil $CO_2$ flux measurement system that can be used with the preferred embodiments described above. This system is referred to as the LI-8100 Multiplex System, which is manufactured by the assignee of the present invention.

While recent media attention has been given to the issues regarding $CO_2$ sequestration and expression from various soils and other mediums, in the context of concerns over global warming, the scientific interest in making this measurement has been present for many years. Initially, as scientific researchers worked to perform these measurements, they were typically forced to make concessions in their protocols for data gathering techniques due to the expense and availability of field portable analyzers. This issue has been mitigated, to a degree, by advancements in infrared-based $CO_2$ detection systems, and the continually falling prices of integrated circuit (IC) components used in field portable units. This has allowed for the advancement of scientific investigation into this area of study by placing lower priced measurement devices with improved accuracy in more places throughout the world.

However, with enhanced knowledge comes an entirely new set of questions. In order to address these new lines of inquiry, there is a market demand that the presently available systems be field upgradeable to support an enhanced spatial resolution. That is to say, that one field analyzer be able to sample multiple locations within a soil $CO_2$ flux site in an automated fashion rather than manually sampling each location individually. This provides the researcher with additional information over a greater spatially diverse plot range without additional time and labor investments. Initially, the market demanded a field-portable instrument that could be dedicated to automated soil $CO_2$ flux measurements. Now that this instrument is commercially available, the demand has shifted to an instrument with enhanced spatial resolution. This forms the basis of the LI-8100 Multiplex System.

Figure 12:
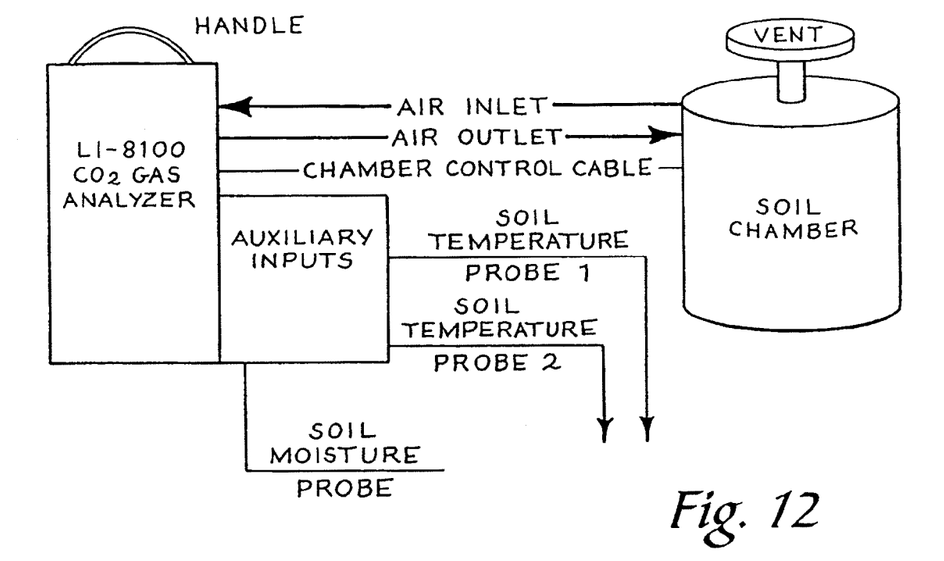
FIG. 12 is a block diagram of a soil flux measurement system of a preferred embodiment.

The LI-8100 is a field-portable system dedicated to soil $CO_2$ flux analysis. It was originally designed as an instrument package that could be hand-carried and battery powered, allowing for a researcher to visit various sites of interest and collect soil $CO_2$ flux measurements at each location in what is commonly referred to as a "Survey" application. Additionally, the LI-8100 was also designed for extended deployment at a single location to collect data continuously. This is commonly referred to as the "Long-term" deployment scenario. FIG. 12 provides a basic block diagram of the LI-8100 system identifying the various components. As the figure shows, the LI-8100 is comprised of three primary elements:

$CO_2$ Infrared Gas Analyzer

Soil $CO_2$ mixing chamber

Auxiliary input ports

The system presently supports two types of remote actuated chambers. The survey chamber is a smaller (i.e., 4" diameter) chamber that is actuated via a pneumatic bellows. This allows the chamber to be raised and lowered over the sample area with minimal disturbance to the sample area and the corresponding microclimate. The long-term chamber is a larger (i.e., 8" diameter) chamber that is electrically actuated via a geared, motorized chain drive mechanism to lift and lower the larger mixing chamber onto and off of the sample area. In both cases, the remote actuation mechanism of each chamber is specifically designed to reduce the amount of experimental error introduced into the measurement due to variations in how individual researchers and technicians employ the equipment. More specifically, with a "manual" chamber, the technician has to place the chamber over the sample area by hand. No two individuals will do this exactly the same way. Moreover, the same individual would be hard pressed to execute the maneuver in a precisely repeatable fashion. A natural consequence is that the microclimate is unintentionally disturbed by the repeated placement of the chamber to record the measurement. This disturbance may cause a variation in the recorded output that, in principle, could be entirely attributed to experimental error. Using a remotely actuated system, may not necessarily eliminate the experimental error. However, it will align the variations introduced into the measurement into a more uniform factor. The remote actuation is a highly consistent, repeatable process. Thus, variation due to chamber placement can be reduced to a more manageable level. In addition to remotely actuated chambers, the LI-8100 also provides 8 auxiliary input lines that the researcher may utilize to embed additional ancillary measurements into the main measurement data stream (e.g., soil temperature, and soil moisture content). These additional factors are not directly used in the computation for the soil $CO_2$ flux, however they can be used for additional analysis and measurement corrections.

Figure 13:
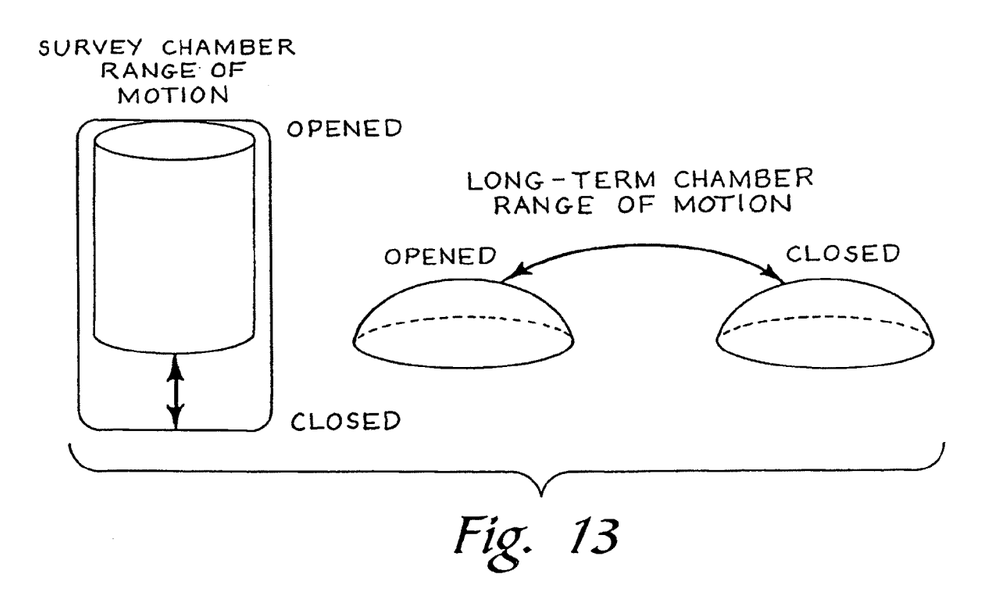
FIG. 13 is a block diagram illustrating a chamber range of motion of a preferred embodiment.

The LI-8100 system employs a transient measurement technique. The transient technique examines the data stream collected by the researcher who specifies a measurement protocol, then fits a 5-degree exponential curve to the data. From this model, the initial $CO_2$ concentration can be computed, and thus the initial $CO_2$ flux can be derived. Additional optimizations targeted for soil $CO_2$ flux measurements come in the operational envelope of the soil $CO_2$ mixing chambers. The Survey Chamber is a four inch diameter "can" which is actuated in a vertical fashion by a pneumatic bellows. The chamber, and bellows circuit are controlled by the LI-8100 system. This chamber was designed with maximum portability in mind as it was anticipated to be used in a "Survey" type application in which a researcher may sample as many as 150 locations in a single work day. As such, a smaller size coupled with ease of manipulation were desired. The long-term chamber was designed to be placed over a sample area and left there for extended periods of time (e.g., on the order of months). Since, portability was less of a concern, the long-term chamber employs an 8 inch diameter "bowl" and a fairly sophisticated support structure to ensure a stable, non-moving position when it is installed in a sample area. To ensure maximum yield from the sample area, the long-term chamber has the added benefit of exposing the entire encapsulated sample area to the environment when in the open position by translating the bowl completely away from the region and allowing environmental factor (e.g., wind, rain, sun, etc.) to reach the sample area just as it would if the chamber were not present at all. This allows the researcher to measure the soil $CO_2$ flux in as representative an environment as possible. Both chamber operational envelopes are illustrated by FIG. 13.

Figure 14:
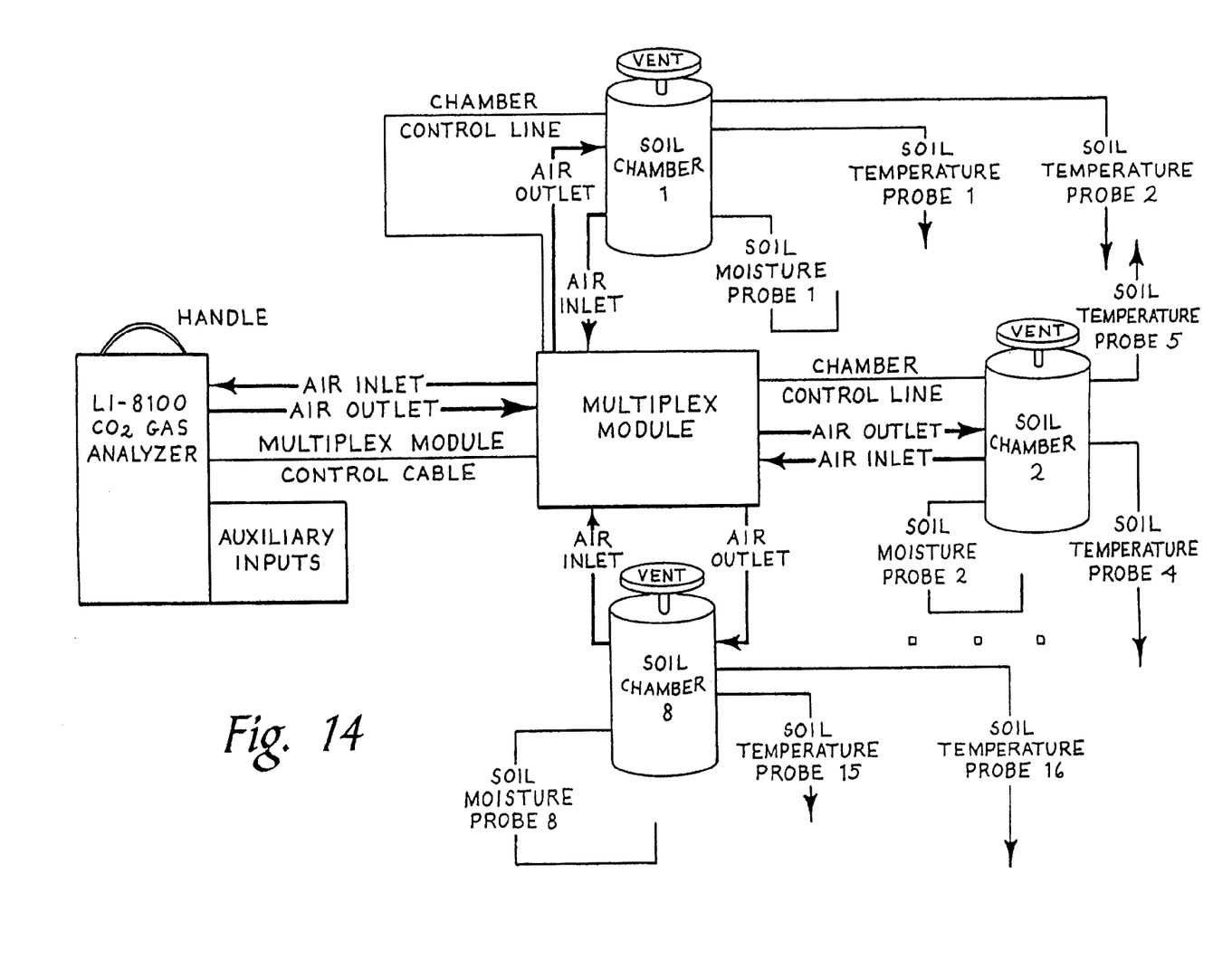
FIG. 14 is a block diagram of a multiplex module of a preferred embodiment.

While the LI-8100 provides the capability for a researcher to obtain soil $CO_2$ flux measurements in a variety of environments and is dedicated to making the most accurate measurement possible, it is presently restricted to using a single chamber at a time in a given deployment scenario. This has become an issue within the scientific community as they now have an additional requirement to be able to characterize a sample region larger than a single chamber can accommodate. This has sparked the demand for the ability to support multiple chambers from a single analyzer in an automated fashion as illustrated in FIG. 14.

Figure 15:
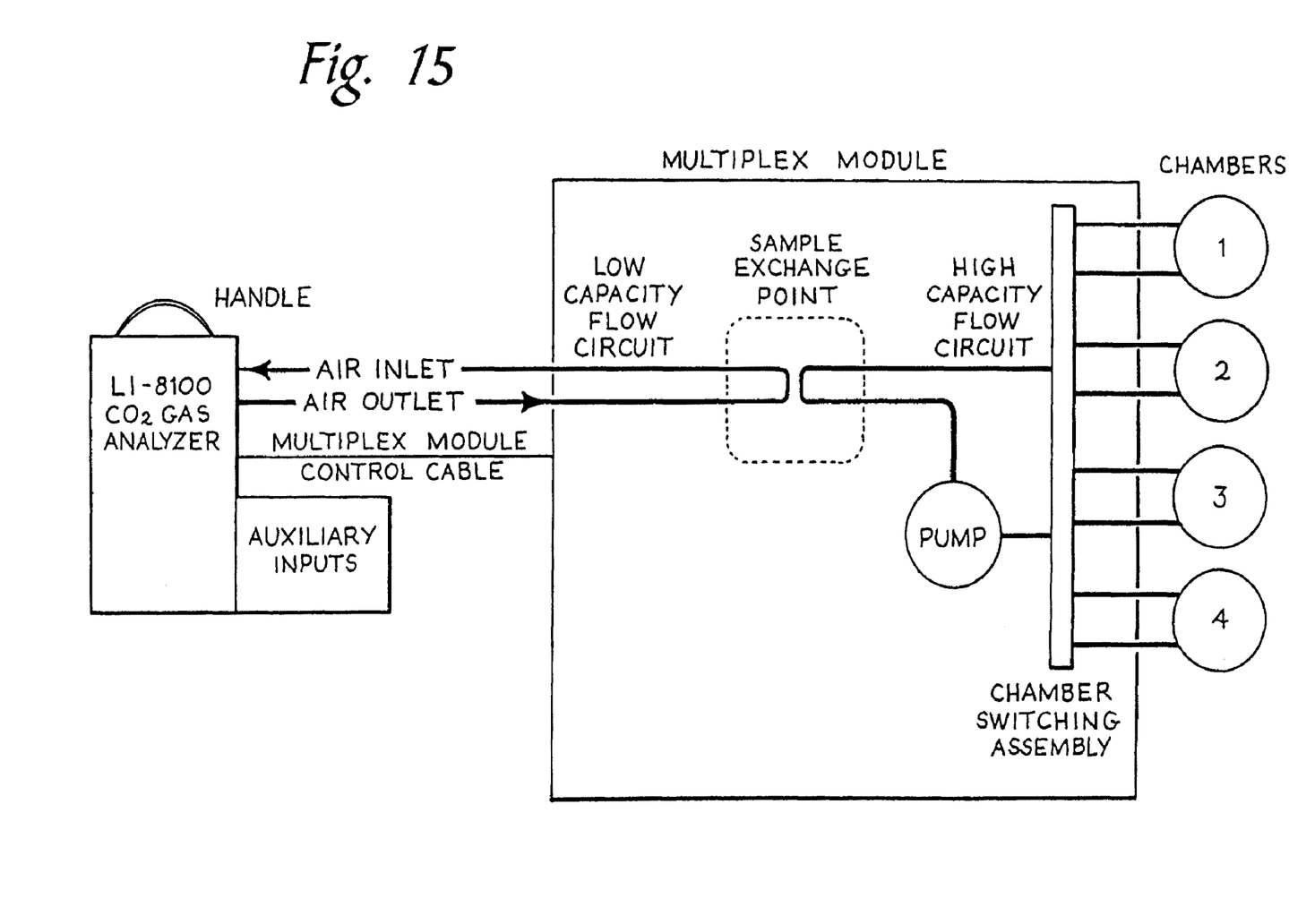
FIG. 15 is a block diagram of a high/low capacity flow interface of a preferred embodiment.

The primary purpose of the LI-8100 multiplex module is to allow a single LI-8100 analyzer to sample and actuate multiple chambers in a serial fashion. Each chamber will be sampled individually in a serial fashion allowing the researcher to cover more physical ground in a single installation without the need to move the equipment. Each chamber can be located up to 20 meters away from the multiplex module allowing the researcher to examine various locations located within a 20 meter radial envelop with the multiplex module at the center. While the chambers themselves will not translate from place to place, they can be easily relocated within that envelope without the need to move any additional equipment. The multiplex module itself will have a high-capacity flow pump which will allow each chamber (which comprises a total gas transfer loop of 120 feet) to be sampled in a reasonable amount of time (3-6 minutes). Additionally, the multiplex module will support 2 soil temperature probes and 1 soil moisture probe at each chamber location. The multiplex module will be designed such that an existing LI-8100 Analyzer can be connected to it without modification. This will require a delicate interface to be established between a high-capacity flow circuit, and a low capacity flow circuit as illustrated in FIG. 15.

The interface, known as the sample exchange point, will be an exchange volume from which gas coming from a designated chamber will be pumped, then sampled at a significantly lower flow rate by the analyzer. Careful consideration will need to be given to the placement of the chambers and their relative difference from the multiplex module. All chambers should have the same length of tubing running from the multiplex module to each chamber to provide a uniform sampling pattern as the box switches from each chamber to the next. It is anticipated that the chambers will be sampled in a round-robin fashion though there is no prevailing argument for or against such sampling schemes. It should be possible to program the apparatus to sample the chambers in any order desired, to satisfy whatever scientific point is attempting to be made.

It is intended that the foregoing detailed description be understood as an illustration of selected forms that the invention can take and not as a definition of the invention. It is only the following claims, including all equivalents, that are intended to define the scope of this invention.

What is claimed is:

1. A soil flux measurement system comprising:
   a chamber;
   a gas analyzer; and
   a leak detection system, wherein the chamber, the gas analyzer, and the leak detection system are coupled together with conduits, the leak detection system comprising:
   a pump;
   a valve; and
   a pressure transducer.

2. The soil flux measurement system of claim 1 further comprising:
   At least one additional chamber; and
   A multiplexer coupled with the first-mentioned chamber and the at least one additional chamber with conduits.

* * * * *